C. W. CRAMER.
DEMOUNTABLE RIM FOR RESILIENT TIRES.
APPLICATION FILED APR. 12, 1911.
1,095,385.
Patented May 5, 1914.
2 SHEETS—SHEET 1.
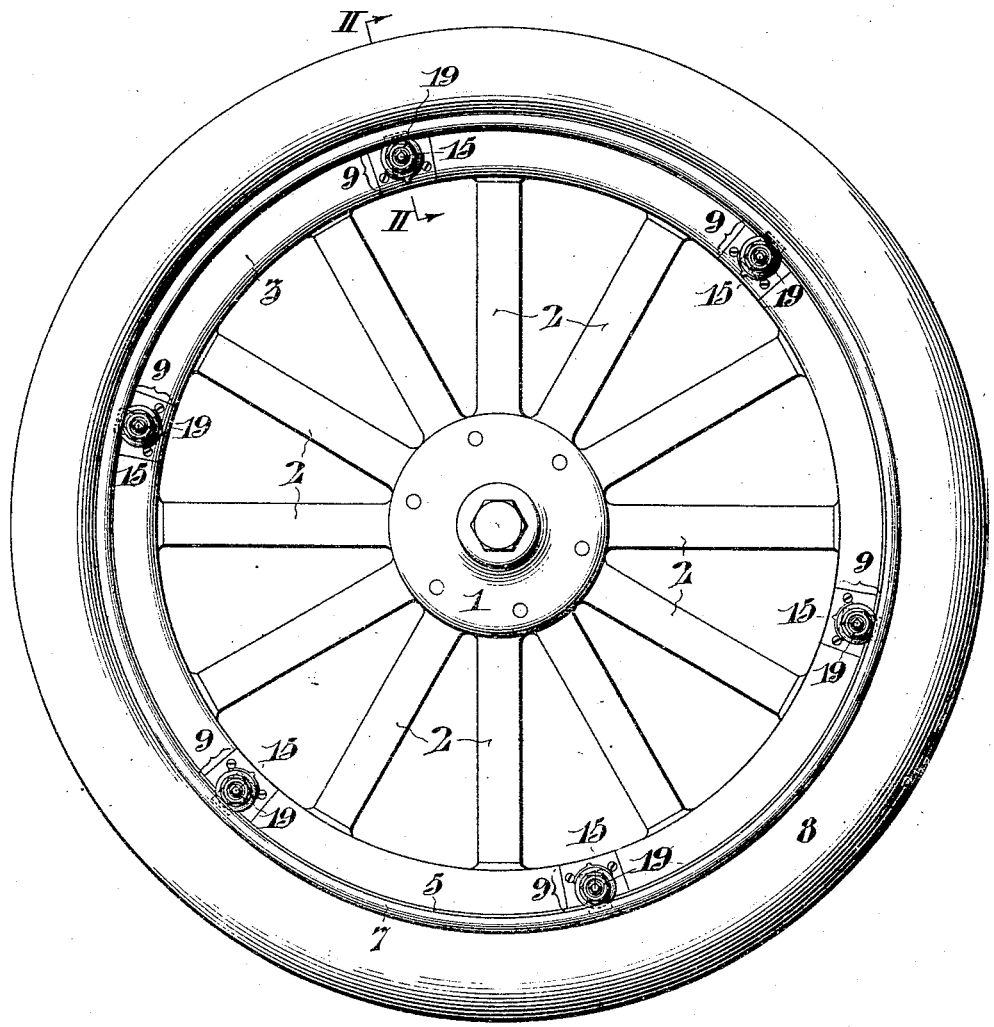
FIG. I.
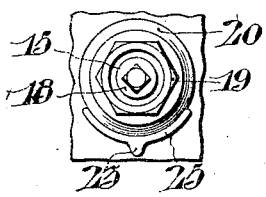
FIG. IV.
Inventor
Charles W. Cramer;
Witnesses

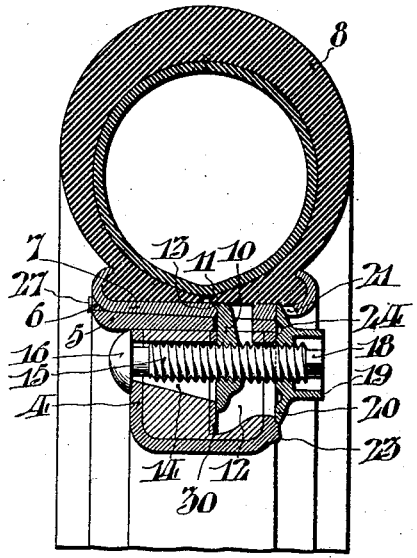
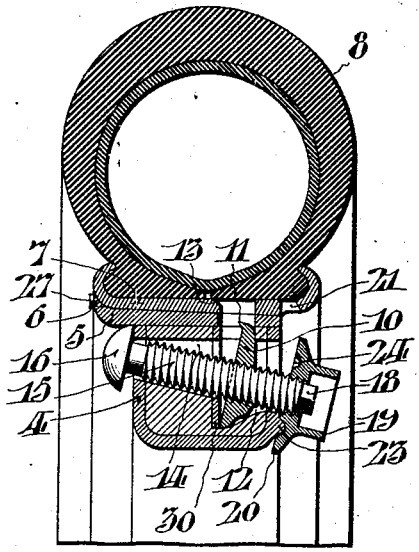

UNITED STATES PATENT OFFICE.

CHARLES W. CRAMER, OF SCRANTON, PENNSYLVANIA.

DEMOUNTABLE RIM FOR RESILIENT TIRES.

1,095,385.  Specification of Letters Patent.  Patented May 5, 1914.

Application filed April 12, 1911. Serial No. 620,543.

*To all whom it may concern:*

Be it known that I, CHARLES W. CRAMER, of the city of Scranton, county of Lackawanna, and State of Pennsylvania, have invented certain new and useful Improvements in Demountable Rims for Resilient Tires, whereof the following is a specification, reference being had to the accompanying drawings.

The invention relates to new and useful improvements in demountable rims for resilient tires, for use in connection with vehicles, and more especially motor propelled vehicles.

An object of the invention is to provide an improved construction of demountable rim wherein the tire rim is positively held on the felly rim by locking dogs which are spaced about the felly, which dogs may be readily withdrawn so as to permit lateral movement of the tire rim and the demounting of the same.

A further object of the invention is to provide a construction of the above character with a secondary locking nut which holds the parts firmly in locked position.

These and other objects will in part be obvious, and will in part be hereinafter more fully described.

In the drawings which show by way of illustration, one embodiment of the invention; Figure I, is a side view of a vehicle wheel having my improvement applied thereto. Fig. II, is a section on the line II, II, of Fig. I. Fig. III, is a view similar to Fig. II, showing the locking dog removed from engagement with the tire rim. Fig. IV, is a detail showing the retaining shoulder for the locking nut.

In carrying out my invention, I have provided a vehicle wheel, which consists of a hub 1, on which are mounted spokes 2, carrying at their outer ends a felly 3. The felly 3, is provided with the usual metal side plates 4, 4, and with a rim 5, which is formed at one side with a flange 6, which extends entirely about the rim. On the other side of the felly rim the flange is omitted, so that a demountable rim 7, may be easily slid on to the felly rim, and seated against the flange 6, on said felly rim.

In order to facilitate the placing of the tire rim on the felly rim, I have formed the felly rim so that the same tapers from a point adjacent the flange 6, to the other side thereof, and I have also formed the tire rim 7, so that the same tapers in the opposite direction. This tapering of the rims allows the valve stem to be inserted in the opening in the tire rim, after which the felly rim may be swung into place.

A resilient tire 8, is attached to the demountable rim in any of the well known ways, and in placing the tire on the vehicle wheel, the demountable rim carrying the tire, is placed on the felly rim and secured thereto by my improved locking means.

The means for locking the tire rim on the felly rim as herein shown, consists of a plurality of locking devices 9, which are spaced about the wheel as shown in Fig. I. These locking devices are all similar in construction, and therefore, a description of one will serve for the others. Each of the locking devices consists of a securing dog 10, which is provided with a laterally projecting wedge-shaped face or toe at its outer end. Said dog is located in a pocket 12, formed in the felly 3. Openings are cut through the felly rim and tire rim, so as to register with the pocket 12. The opening in the felly rim is slightly larger than the opening in the tire rim, as shown in Figs. II, and III, so that the locking dog may be clamped against the wall in the opening in the tire rim, without contacting with the wall in the opening in the felly rim. The locking dog is inserted through the openings above referred to, and its outer end brought to a position substantially flush with the outer face of the tire rim. The edge of the opening in the tire rim is preferably cut away to form a seat 13, for the projecting wedge or toe 11. The felly 3, is provided with a recess 14, which leads from the pocket 12, to the outer face of the felly. A screw 15, is located in said recess, and is formed with a head 16, which is slightly larger than the recess at the outer face of the felly, so that said head will engage the face of the felly. The locking dog 10, is threaded and the screw or bolt 15, is formed with a corresponding thread, so that by turning the screw or bolt, the dog may be brought into locking engagement with the tire rim as above noted, and will clamp the tire rim against the flange 6, on the felly rim. A wear plate 30, is inserted in said pocket and engages the inner wall of the pocket. The wear plate prevents undue wear on the felly from the dog 10. The screw or bolt 15, is preferably formed with a squared head 18, adapted to receive a suitable wrench for turning the same.

The recess 14, as clearly shown in Figs. II, and III, is tapered so that the screw 15, may swing about its head as a pivotal center, and the locking dog 10, lowered from the opening in the tire rim so as to allow the tire rim and tire mounted thereon to be moved laterally from the felly rim. I preferably cut away the felly in forming the pocket 12, so that the metal side plate 4, forms one wall of the pocket. This prevents the dog from catching in the wooden parts of the felly and allows a free movement of the dog into and out of locking position. As a means for further securing the tire rim on the felly rim, I have provided a locking nut 19, which is adapted to be threaded on to the outer end of the screw 15. This nut has an enlarged circular base or flange 20, which extends into a recess or groove 21, in the tire rim, when the locking dog is positioned to engage the tire rim. The nut 19, will clamp the side of the felly and the wall of the groove or recess 21, and aid the locking dog in holding the tire rim on the felly rim.

In order to aid in holding the locking dog withdrawn to inoperative position, I have formed the metal side plate 4, with a projecting stud 23, which is so located as to engage an annular groove 24, in the locking face of the nut 19, when said locking screw or bolt 15, is moved to a position to withdraw the locking dog from the opening in the tire rim. By this means the locking dog may be readily secured in the position stated.

In order to aid in holding the locking screw or bolt and the locking dog in operative position, that is, with the locking dog properly placed against the tire rim, I have formed the metal side plate 4, with a retaining ridge 25, which will engage the flange 20, of the locking nut 19, as clearly shown in Fig. IV. This shoulder prevents the nut working up and thus holds the locking dog in proper position to engage the tire rim. To aid in registering the openings in the tire rim with those in the felly, I have formed the flange 6, with a slot or recess adapted to receive a lug 27, formed on the demountable rim, which slot and lug are located in a predetermined position relative to these openings.

In the operation of my device, the screw 15, is turned so as to release the locking dog 10, and position the parts as shown in Fig. III. The tire rim, with the tire thereon, is placed over the valve stem, with the lug 27, in engagement with the recess formed in the flange 6. The other part of the tire rim is then slid or swung laterally into engagement with the felly rim, and seated against the flange 6. The nut 19 is turned sufficiently to release the same from the stud 23, and the locking bolt is then swung about the head thereof as a pivotal center, until the parts thereon are moved to the position shown in Fig. II. This carries the locking dog out through the recess in the tire rim, and the turning of the locking screw will cause the dog to clamp the tire rim firmly against its seat on the felly rim. The locking nut 19, is turned against the face of the felly, and also against the tire rim, and thus assists in locking the tire rim on the felly rim. In removing the tire rim, the operation is substantially the reverse of that above described.

It is obvious that minor changes in the details of construction may be made without departing from the spirit of my invention, as set forth in the appended claims.

Having thus described my invention, I claim:

1. In a demountable vehicle rim, the combination with a fixed wheel member, having a transverse recess formed therein, of a removable rim mounted on said member, means for limiting the lateral movement of said rim in one direction, a screw located in said recess and a locking dog disposed in said recess, and mounted on the screw and adapted to lock the rim against lateral movement in the opposite direction, one end of said screw being loosely pivoted at one side of the member to permit the other end thereof to be swung inwardly to disengage the dog from the rim.

2. In a demountable vehicle rim, the combination with a felly formed with a transverse recess, of a felly rim having a stop on one side thereof, a tire rim adapted to seat on said felly rim and engage said stop, and a locking device for said tire rim, including a dog constructed to engage said rim and lock the same against the stop on the felly rim, and an adjusting screw for each dog, the dog and screw being disposed in the recess of the felly, one end of said screw being loosely pivoted at one side of the member to permit the other end thereof to be swung inwardly to disengage the dog from the rim.

3. In a demountable vehicle rim, the combination with a felly; a felly rim having a flange on one side thereof; a tire rim carrying a resilient tire adapted to seat on said felly rim and engage said flange; of a plurality of locking devices each including a locking dog, constructed to engage said tire rim and hold the same seated against the flange on the felly rim, a screw for each locking device; said felly having a recess to receive the screw, which recess is shaped so as to allow the screw to be swung to withdraw the locking dog from the path of lateral movement of the tire rim; said locking dog having a laterally projecting toe, and said tire rim having a recess forming a wall adapted to be engaged by said toe of the locking dog.

4. In a demountable vehicle rim; the combination with a felly; a felly rim having a flange on one side thereof; a tire rim adapted to seat on said felly rim and engage said flange, said tire rim and said felly rim having openings formed there-through between the side edges thereof; a locking dog adapted to extend through said opening and engage said tire rim for holding the same seated against said flange on the felly rim; a screw threaded through said locking dog, and located in the recess formed in the felly; said felly having a pocket formed therein to receive said locking dog; and a locking nut threaded on said screw and engaging the outer face of the felly.

5. In a demountable vehicle rim; the combination with a felly rim having a flange on one side thereof; a tire rim adapted to seat on said felly rim and engage said flange; said tire rim and said felly rim having openings formed there-through between the side edges; a locking dog adapted to extend through said openings and engage said tire rim for holding the same seated against said flange on the felly rim; a screw threaded through said locking dog and located in the recess formed in the felly; said felly having a pocket formed therein to receive said locking dog; and a locking nut threaded on said screw and engaging the outer face of the felly; said locking nut having a flange which extends into a groove in the tire rim for assisting the locking bolt in holding the tire rim on the felly tire.

6. In a demountable vehicle rim; the combination with a felly; a felly rim having a flange on one side thereof; a tire rim adapted to seat on said felly rim and engage said flange; said felly having a pocket formed therein and a tapered recess extending from the pocket to the outer face of said felly; said tire rim and felly rim having openings formed therein registering with said pocket; a locking dog located in said pocket and adapted to extend through said opening and engage the tire rim; a headed screw having a threaded engagement with the locking dog, a nut engaging the outer end of the screw and bearing against the outer face of the felly; said nut having a flange adapted to extend into a groove formed in the tire rim; said locking dog having a laterally projecting toe and said tire rim having a recess forming a wall adapted to be engaged by said wedge face of the locking dog.

7. In a demountable vehicle rim, the combination with a felly having a plurality of transverse recesses formed therein, of a tapered felly rim having a flange at the enlarged side thereof, a reversely tapered tire rim adapted to seat on said felly rim, and engage said flange, and a plurality of locking devices respectively located in said recesses, each device including a locking dog constructed to engage said tire rim and hold the same seated against the flange of the felly rim, and a screw for each locking dog, said screw having one end loosely pivoted at one side of the felly to permit the other end thereof to be swung inwardly to disengage the dog from the rim.

8. In a demountable vehicle rim, the combination with a felly, a felly rim having a flange on one side thereof; a tire rim carrying a resilient tire adapted to be seated on said felly rim and engage said flange; of a plurality of locking devices, each including a locking dog constructed to engage said tire rim and hold the same seated against the flange on the felly rim, a screw for each locking dog, a locking nut for each screw, said screw being connected to the felly so as to be swung to withdraw the locking dog from the path of lateral movement of the tire rim, said felly and said locking nut having coöperating locking devices, for holding the screw with the locking dog withdrawn from the path of movement of the tire rim.

9. In a demountable vehicle rim, the combination with a felly, a felly rim, having a flange on one side thereof; a tire rim carrying a resilient tire adapted to seat on said felly and engage said flange; of a plurality of locking devices each including a locking dog constructed to engage said tire rim and hold the same seated against the flange on the felly rim, a screw for each locking dog, a locking nut for each screw, said screw being connected to the felly so as to be swung to withdraw the locking dog from the path of lateral movement of the tire rim, said felly having a retaining ridge engaging the flange on the locking nut for holding the screw with the locking dog in normal position to engage the shoulder on the tire rim.

10. In a demountable vehicle rim, the combination with a felly; of a felly rim having a flange on one side thereof; a tire rim carrying a resilient tire adapted to seat on said felly rim and engage said flange; of a plurality of locking devices, each including a locking dog constructed to engage said tire rim and hold the same seated against the flange on the felly rim; a screw for each locking device; said felly having a recess to receive the screw, which recess is shaped so as to allow the screw to be swung to withdraw the locking dog from the path of lateral movement of the tire rim; said locking dog having a laterally projecting toe, and said tire rim having an opening forming a wall adapted to be engaged by said toe of the locking dog; one of said rims having a recess, and the other of said rims having a lug for engaging the recess for registering the openings in the rims, through which the locking dogs extend.

11. In a demountable vehicle rim, the combination with a felly having a transverse recess formed therein, of a felly rim having a flange, a tire rim adapted to seat on the felly rim and engage said flange, said tire rim having an opening disposed on the side opposite the flange on the felly rim and exterior of said felly, a screw disposed in the recess of the felly and having the end thereof opposite said opening loosely pivoted to permit the end thereof adjacent said opening swinging inwardly, a dog carried by said screw for engagement with the tire rim to lock the latter against the flange of the felly rim, and a nut on the end of the screw opposite the fulcrum thereof and provided with a flange extending into said opening and engaging one wall thereof to clamp the tire rim against the flange.

12. In a demountable vehicle rim, the combination of a felly; a felly rim having a flange; a tire rim carrying a resilient tire, adapted to seat on the felly rim, and engage said flange, said tire rim having a plurality of openings on the side opposite the flange on the felly rim, locking devices for each opening, including a bolt carried by the felly; a nut on the bolt having a flange extending into said opening and engaging one wall thereof to clamp the tire rim against the flange; and a shoulder carried by the felly and engaging the flange of the nut to prevent lateral movement of the bolt and the disengagement of the flange from the wall in the tire rim.

In testimony whereof, I have hereunto signed my name at Philadelphia, Pennsylvania, this thirtieth day of March, 1911.

CHARLES W. CRAMER.

Witnesses:
JAMES H. BELL,
E. L. FULLERTON.